2,784,144

MICROBIAL HYDROLYSIS OF STEROIDAL SAPONINS

Merle M. Krider and Theone C. Cordon, Philadelphia, and Monroe E. Wall, Oreland, Pa., assignors to the United States of America as represented by the Secretary of Agriculture No Drawing. Application June 2, 1953,
Serial No. 359,234

4 Claims. (Cl. 195—32)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention pertains to the microbiological cleavage of steroidal saponins whereby steroidal sapogenins are produced. An object of this invention is to provide a process for the microbiological hydrolysis of steroidal saponins. Another object is to provide a process for producing steroidal sapogenins from saponins containing them without resort to drastic physical or chemical treatment.

Steroidal sapogenins are useful as chemical intermediates for the synthesis of cortisone and sex hormones. They occur in nature in a combined, glycosidal form known as saponins. The usual method of recovery involves hydrolysis of the saponin by the action of hot, strong, mineral acid. This drastic treatment requires expensive, corrosion-resistant equipment. Also, it results in the formation of undesirable by-products which complicate purication of the produce and reduce the yield.

We have now discovered a novel, simple and inexpensive process for hydrolyzing steroidal saponins which avoids the use of heat and strong chemicals and thus avoids most of the difficulties and disadvantages of the prior art. We have discovered that many microorganisms produce enzymes capable of hydrolying steroidal saponins rapidly and at ordinary temperatures.

Since most steroidal saponins are soluble in water while the corresponding sapogenins are not, the hydrolysis and the subsequent recovery of the sapogenin are easily and inexpensively achieved.

In practice, the saponin is extracted from the plant tissue in which it occurs by use of a suitable solvent, such as water or alcohol; a suitable microorganism is cultured in an aqueous solution of the saponin; the sapogenin formed, being insoluble in the medium, is readily recovered by filtering, centrifuging, decanting or extracting with a suitable solvent.

Many microorganisms have the ability to cleave saponins. While most of the identified organisms we have used are fungi of the order Moniliales, other fungi, as well as some yeasts and bacteria have been found effective.

The saponin cleavage is known to be catalyzed by an enzyme or enzymes produced and literated by the organisms. Some organisms that normally produce little or none of these enzymes can be induced to produce it by repeated culturing on a medium containing saponin.

There exists in nature a wide variety of saponins, most of them being unidentified or of unknown chemical structure. The sapogenins, on the other hand, are well known and have had their chemical structure elucidated. The sapogenins of most current interest are diosgenin, smilagenin, sarsasapogenin, tigogenin, hecogenin, gitogenin and manogenin and all of these may be produced from saponins containing them by our microbiological process.

In general, our process is conducted under the usual conditions for optimum microbiol growth. Thus, the temperature is usually about 25° C. but may be anywhere in the range of about 20° to 40° C. The pH is preferably about 6.0 but may be higher or lower within the range of about 4 to 8. Surface or submerged culture, with or without aeration may be used. Generally we prefer to operate with agitation and aeration. Sterile conditions are sometimes preferable but are not essential. The time required for the hydrolysis will vary according to the conditions but is usually of the order of 48 hours.

*Example 1.—Non-sterile conditions*

In a typical experiment, 19 lbs. of frozen *Agave toumeyana* leaves were ground, then extracted by stirring for 30 minutes in six gallons of water at 100° C. The aqueous extract was strained through cheesecloth. The wet, fibrous residue was squeezed in a lard press, soaked with two liters of warm water and pressed again. All aqueous fractions were clarified by centrifuging, combined (23.65 libers) in a 12-gallon carboy, and adjusted to pH 5.75.

A stirrer, air sparger, air vent, and sampling tube, mounted in a rubber stopper, were introduced into the carboy.

The inoculum was a 48-hour vegetative culture of *Penicillium cyclopium* (Westling), growing in a saponin containing medium.

Temperature varied from 26° to 29° C.

Samples were withdrawn from the carboy over a five day period beginning at the time of adding the inoculum. After the first day 2 N sodium hydroxide was added as required to maintain pH 5.5–6.5. Based on a 4 N hydrochloric acid hydrolyzed control value of 198 mg. sapogenin acetate per 100 ml. substrate the following yields were obtained:

| Time since inoculation, hours | Hydrolysis of saponin, percent |
|---|---|
| 0 | 0 |
| 12 | 38 |
| 24 | 50 |
| 48 | 60 |
| 120 | 80 |

The substrate was centrifuged. The sludge was extracted with benzene-ethanol to recover the sapogenins. Chromatography of the crude sapogenins resulted in the isolation of tigogenin, hecogenin, gitogenin, and manogenin and $\Delta^9$-manogenin. The isolated sapogenins are identical with those obtained from the same shipment of *Agave toumeyana* when the hydrolysis was performed by 2 or 4 N hydrochloric acid.

*Example 2.—Sterile conditions*

Sterile conditions were obtained by first autoclaving the carboy containing the substrate and operating equipment. Subsequently a pure culture inoculum of *Penicil-*

*lium cyclopium* (Westling) was added under asceptic conditions. After 7 days microscopic examination revealed no foreign microorganisms in the substrate and, although no alkali had been added, the acidity of the substrate had not reached pH 5.0

Although in this specific example hydrolysis of the saponin proceeded at a slightly lower rate than that observed for the non-sterile conditions of Example 1, the difference in yield of sapogenins recovered at 48 and 120 hours were only 3–5%. With increase in time elapsed after inoculation to 240 hours, under these conditions 90% of the saponins were hydrolyzed to sapogenins.

*Example 3.—Variation of substrate*

An aqueous crude saponin substrate was prepared from leaves of *Agave serulata*. The sample was autoclaved, inoculated with *Penicillium cyclopium* (Westling) and allowed to stand at room temperature for two weeks. A 30% yield of sapogenin was recovered.

*Example 4.—Addition of nutrients*

An aqueous crude saponin extract of *Agave toumeyana* was divided into four equal portions. One aliquot was hydrolyzed with 4 N hydrochloric acid. The three remaining portions were added to flasks containing respectively, nothing, 0.3% peptone, and 0.3% peptone plus 0.15% $K_2HPO_4$. The three flasks were autoclaved and inoculated with *Penicillium cyclopium* (Westling). There was no significant difference in the weights of sapogenins recovered from each of the four flasks.

*Example 5.—Purified saponin substrate*

Saponins were extracted with butanol from the crude aqueous, or aqueous-ethanolic extracts of *Agave toumeyana*. Most of the butanol was removed by evaporation, adding water to maintain a desired volume of solvent for the saponins. Benzene extractions simultaneously removed the remainder of butanol and benzene-butanol soluble substances, including any sapogenins resulting from enzyme action prior to the above treatment. Heating the saponin preparation drove off traces of benzene. An aliquot of the purified saponin substrate was autoclaved, adjusted to pH 5.8, and inoculated with *Penicillium cyclopium* (Westling). After three days on a shaker at 25° C. sapogenins representing a 60% yield were recovered.

*Example 6.—Various inocula on purified saponin substrate*

The procedure was the same as in Example 5 except for the fungus used for the inoculum. Results were as follows:

| Microorganism Used for Inoculum | Hydrolysis of Saponins, Percent |
|---|---|
| *Penicillium cyclopium* Westling, Pen S | 70 |
| *Penicillium chrysogenum*, NRRL 807 | 38 |
| *Aspergillus niger*, TC-215-4247 | 41 |
| *Aspergillus niger*, NRRL 330 | 50 |
| *Aspergillus niger*, NRRL 1292 | 66 |
| *Aspergillus niger*, ALCA 5 | 62 |
| *Aspergillus niger*, van Tieghens, NRRL 328 | 61 |
| *Aspergillus niger*, van Tieghens, NRRL 334 | 36 |
| *Aspergillus awamori* Nakazawa, An8 | 25 |
| *Aspergillus phonecis*, NRRL 1956 | 31 |
| *Aspergillus tamarii* Kita, RB1 | 79 |
| *Aspergillus glaucus*, CZ5 | 26 |
| *Aspergillus chevalieri*, CZ43 | 75 |

Certain as yet unidentified yeast-like microorganisms and bacteria can also effect the cleavage.

In addition to the microorganisms used in the examples above we have also used successfully many others. In the genus Aspergillus we have used the species *awamori* Nakazawa, *phonecis*, *tamarii* Kita, *chevalieri* and *glaucus*. Of the many strains of *Aspergillus niger* we have used TC-215-4247, ALCA No. 5, and NRRL Nos. 328, 330, 334 and 1292.

In addition to the above mentioned identified organisms we have many unidentified molds, yeast and bacteria which similarly have the ability to cleave saponins.

We claim:

1. The process of producing steroidal sapogenins from steroidal saponins which comprises culturing a hydrolytic fungus selected from the group consisting of *Penicillium cyclopium* Westling, *Penicillium chrysogenum*, and Aspergilli in a medium containing the steroidal saponin, and recovering the formed steroidal sapogenins.

2. The process of claim 1 wherein the fungus is of the *Penicillium cyclopium* Westling.

3. The process of claim 1 wherein the fungus is of the genus Aspergillus.

4. The process of claim 1 wherein the fungus is of the species *Aspergillus niger*.

References Cited in the file of this patent

UNITED STATES PATENTS 2,686,752    Wall et al. _____ Aug. 17, 1954

OTHER REFERENCES

Winterstein: Zeitschrift fur Physiol., vol. 199 (1931), pp. 25–37.